United States Patent
Chen

(10) Patent No.: US 9,405,387 B2
(45) Date of Patent: Aug. 2, 2016

(54) CURSOR CONTROL APPARATUS AND CURSOR CONTROL METHOD THEREOF

(71) Applicant: GETAC TECHNOLOGY CORPORATION, Hsinchu County (TW)

(72) Inventor: Ching-Chuan Chen, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 107 days.

(21) Appl. No.: 14/489,433

(22) Filed: Sep. 17, 2014

(65) Prior Publication Data

US 2016/0077605 A1    Mar. 17, 2016

(51) Int. Cl.
*G06F 3/038* (2013.01)
*G06F 3/0481* (2013.01)
*G06F 3/14* (2006.01)

(52) U.S. Cl.
CPC .............. *G06F 3/038* (2013.01); *G06F 3/0481* (2013.01); *G06F 3/1423* (2013.01); *G06F 3/1431* (2013.01); *G06F 3/1446* (2013.01)

(58) Field of Classification Search
CPC .......... G09G 2340/0457; G09G 5/227; G09G 2370/16; G06F 3/048; G06F 3/038; G06F 3/1423; G06F 3/1431; G06F 3/1438; G06F 3/1446
USPC ........................................................ 345/157
See application file for complete search history.

(56) References Cited

U.S. PATENT DOCUMENTS

| | | | | |
|---|---|---|---|---|
| 5,793,361 A * | 8/1998 | Kahn | ................... | G06F 3/03542 345/1.3 |
| 6,072,469 A * | 6/2000 | Chen | ................... | G06F 3/03548 345/157 |
| 6,219,027 B1 * | 4/2001 | Shimizu | ................... | G06F 3/038 345/2.1 |
| 6,331,840 B1 * | 12/2001 | Nielson | ................... | G06F 3/0488 345/1.1 |
| 6,470,341 B1 * | 10/2002 | Rekimoto | ............. | G06F 3/0488 |
| 6,549,214 B1 * | 4/2003 | Patel | ..................... | G06F 3/1454 345/1.1 |
| 6,842,795 B2 * | 1/2005 | Keller | ..................... | G06F 3/023 345/156 |
| 7,124,374 B1 * | 10/2006 | Haken | ..................... | G06F 3/038 715/761 |
| 7,355,593 B2 * | 4/2008 | Hill | ........................ | G06F 3/0428 345/169 |
| 7,430,721 B2 * | 9/2008 | Johanson | ................ | G06F 3/023 715/751 |
| 7,696,978 B2 * | 4/2010 | Mallett | ................... | G06F 3/016 345/156 |
| 8,194,036 B1 | 6/2012 | Braun et al. | | |

(Continued)

FOREIGN PATENT DOCUMENTS

CN          1325060 A  * 12/2001

*Primary Examiner* — Julie Anne Watko

(57) ABSTRACT

A cursor control apparatus and a cursor control method thereof are provided. Adjust a position of a cursor on a second axial direction according to a DPI ratio on a first axial direction of display units with different DPI values, so as to make the cursor move smoothly between the display units with different DPI values, in which the first axial direction is perpendicular to the second axial direction, and the display units with different DPI values are arranged along the first axial direction.

16 Claims, 4 Drawing Sheets

(56) References Cited

U.S. PATENT DOCUMENTS

| | | | | |
|---|---|---|---|---|
| 8,502,778 | B2* | 8/2013 | Lin | G09G 5/00 345/156 |
| 8,732,373 | B2* | 5/2014 | Sirpal | G06F 1/1632 710/303 |
| 8,823,656 | B2* | 9/2014 | Simmons | G06F 1/1641 345/1.1 |
| 8,866,754 | B2* | 10/2014 | Homma | G06F 3/0416 345/1.1 |
| 2008/0301675 | A1* | 12/2008 | Cromer | G06F 3/1438 718/1 |
| 2010/0333041 | A1* | 12/2010 | Fabrick, II | G06F 3/038 715/862 |
| 2011/0109550 | A1* | 5/2011 | Shih | G06F 3/03543 345/163 |
| 2012/0249463 | A1* | 10/2012 | Leung | G06F 3/017 345/173 |
| 2012/0274656 | A1* | 11/2012 | Kang | G06F 1/1632 345/619 |
| 2013/0198629 | A1* | 8/2013 | Tandon | H04M 3/567 715/716 |
| 2014/0078056 | A1* | 3/2014 | Yu | G06F 3/0317 345/157 |
| 2015/0002397 | A1* | 1/2015 | Song | G06F 3/03543 345/163 |
| 2015/0077365 | A1* | 3/2015 | Sasaki | G06F 3/1446 345/173 |
| 2016/0054817 | A1 | 2/2016 | Chen | |

* cited by examiner

CURSOR CONTROL APPARATUS AND CURSOR CONTROL METHOD THEREOF

BACKGROUND OF THE INVENTION

1. Field of the Invention

The present invention relates to input apparatuses, and more particularly, to a cursor control apparatus and a cursor control method thereof.

2. Description of the Prior Art

Extended display entails connecting a host computer to at least two display screens in a computer system to allow the desktop of a Windows operating system to span multiple screens and thus create desktop accessible space larger than a single screen. Extended display is particularly important to notebook computer users. In general, since the screen of a notebook computer is small, a user who needs to work with multiple application windows simultaneously must have the application windows overlapped and displayed on the desktop to the detriment of ease of reading window contents. To overcome the aforesaid drawback, the user can resort to extended display whereby the host computer is connected to at least one external screen such that a portion of windows is disposed on the extended desktop.

Due to advancements of display unit technology, not only is the resolution of screens becoming higher in recent years, but various display units which come in different sizes are also commercially available in order to meet customer needs at different levels. Hence, the DPI (dots per inch) values of the display units for use by users in effectuating extended display are always different from the default DPI values of the display units. Therefore, the velocity and position of a cursor changes whenever the cursor moves between display unit frames with different DPI values; as a result, cursor control deteriorates, and thus user's perception is compromised. Hence, users have to accommodate to the changes in the velocity of the cursor which moves across display units with different DPI values. Moreover, in the situation where display unit frames with different DPI values are arranged side by side, as soon as the cursor crosses the boundary between one display unit and another display unit, the cursor "leaps" vertically and thus its path is never smooth. Likewise, in the situation where display unit frames with different DPI values are arranged one above the other, as soon as the cursor crosses the boundary between one display unit and another display unit, the cursor "leaps" horizontally and thus its path is never smooth.

SUMMARY OF THE INVENTION

The present invention provides a cursor control apparatus and a cursor control method thereof conducive to enhancement of the quality control of a cursor.

The cursor control apparatus of the present invention is adapted to control a cursor which moves back and forth between a benchmark display unit and an extended display unit. The benchmark display unit has a first display region. The extended display unit has a second display region. The first display region is adjacent to the second display region in a first axial direction. The cursor control apparatus comprises a cursor control unit and a processing unit. The cursor control unit generates a displacement value when moved. The processing unit is coupled to the benchmark display unit, the extended display unit, and the cursor control unit. The cursor control unit sends a displacement value to the processing unit. The processing unit calculates a first resolution (dots per inch, DPI) ratio of the benchmark display unit to the extended display unit and a second resolution (dots per inch, DPI) ratio of the extended display unit to the benchmark display unit, determines coordinates of the current position of the cursor, controls the cursor in moving in a first axial direction according to the position coordinates and the displacement value, and selects one of the first DPI ratio and the second DPI ratio, such that the cursor moves back and forth between a first display region and a second display region substantially linearly and in a second axial direction, wherein the first axial direction is perpendicular to the second axial direction.

In an embodiment of the present invention, the first axial direction is a horizontal axial direction, and the first DPI ratio is larger than the second DPI ratio.

In an embodiment of the present invention, the processing unit selects the first DPI ratio when the cursor moves in the first axial direction to go from the first display region to the second display region.

In an embodiment of the present invention, the first display region and the second display region further comprise an incontiguous zone in a first axial direction, and the cursor is confined to the first display region when the cursor moves from the first display region to the incontiguous zone between the first display region and the second display region.

In an embodiment of the present invention, the processing unit selects the second DPI ratio when the cursor moves in the first axial direction to go from the second display region to the first display region.

In an embodiment of the present invention, the first axial direction is a vertical axial direction, and the first DPI ratio is larger than the second DPI ratio.

In an embodiment of the present invention, when the cursor moves in the first axial direction to go from the first display region to the second display region, the processing unit selects the first DPI ratio.

In an embodiment of the present invention, the first display region and the second display region further comprise an incontiguous zone in a first axial direction, and the cursor will be confined to the first display region if the cursor moves from the first display region to the incontiguous zone between the first display region and the second display region.

In an embodiment of the present invention, the processing unit selects the second DPI ratio when the cursor moves in the first axial direction to go from the second display region to the first display region.

The present invention provides a cursor control method, adapted to control a cursor to move back and forth between a benchmark display unit and an extended display unit, wherein the benchmark display unit has a first display region, and the extended display unit has a second display region, wherein the first display region and the second display region are adjacent to each other in a first axial direction. The cursor control method comprises the steps of: receiving a displacement value generated by a cursor control unit when moved; calculating a first DPI ratio of a benchmark display unit to an extended display unit and a second DPI ratio of the extended display unit to the benchmark display unit; determining coordinates of a current position of a cursor; controlling the cursor to move in a first axial direction according to the position coordinates and the displacement value; and selecting one of the first DPI ratio and the second DPI ratio according to the movement direction of the cursor, such that the cursor moves back and forth between the first display region and the second display region substantially linearly and in a second axial direction, wherein the first axial direction is perpendicular to the second axial direction.

In an embodiment of the present invention, the first axial direction is a horizontal axial direction, and the first DPI ratio is larger than the second DPI ratio.

In an embodiment of the present invention, the first DPI ratio is selected when the cursor moves in the first axial direction to go from the first display region to the second display region.

In an embodiment of the present invention, the first display region and the second display region further comprise an incontiguous zone in a first axial direction, wherein the cursor is confined to the first display region when the cursor moves from the first display region to the incontiguous zone between the first display region and the second display region.

In an embodiment of the present invention, the second DPI ratio is selected when the cursor moves in the first axial direction to go from the second display region to the first display region.

In an embodiment of the present invention, the first axial direction is a vertical axial direction, and the first DPI ratio is larger than the second DPI ratio.

In an embodiment of the present invention, the first DPI ratio is selected when the cursor moves in the first axial direction to go from the first display region to the second display region.

In an embodiment of the present invention, the first display region and the second display region further comprise an incontiguous zone in a first axial direction, and the cursor is confined to the first display region when the cursor moves from the first display region to an incontiguous zone between the first display region and the second display region.

In an embodiment of the present invention, the second DPI ratio is selected when the cursor moves in the first axial direction to go from the second display region to the first display region.

Accordingly, the present invention is characterized in that: the position of a cursor in a second axial direction is adjusted according to DPI ratios of display units with different DPI values in a first axial direction when the cursor is moved to display units with different DPI values, such that the cursor moves smoothly between the display units with different DPI values, so as to enhance the quality control of a cursor, wherein the first axial direction is perpendicular to the second axial direction, and the display units with different DPI values are aligned in the first axial direction.

To render the aforesaid features and advantages of the present invention obvious and comprehensible, the present invention is hereunder illustrated with embodiments and drawings and described below.

BRIEF DESCRIPTION OF THE DRAWINGS

The aforesaid features and advantages of the present invention are hereunder illustrated with embodiments in conjunction with the accompanying drawings, in which.

DETAILED DESCRIPTION OF THE EMBODIMENTS

Figure 1:
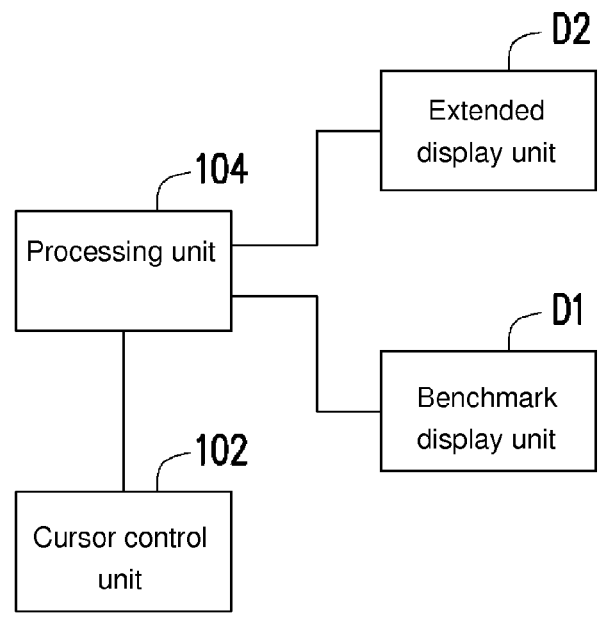
FIG. 1 is a schematic view of a cursor control apparatus according to an embodiment of the present invention.

FIG. 1 is a schematic view of a cursor control apparatus according to an embodiment of the present invention. The cursor control apparatus comprises a cursor control unit 102 and a processing unit 104. The cursor control unit 102 is coupled to the processing unit 104. The processing unit 104 is further coupled to benchmark display unit D1 and extended display unit D2. The benchmark display unit D1 and extended display unit D2 have different DPI values. Specifically speaking, the DPI value of benchmark display unit D1 is larger than the DPI value of extended display unit D2. The cursor control apparatus adjusts the velocity of the cursor displayed on benchmark display unit D1 and extended display unit D2, such that the velocities of the cursor on extended display unit D2 and benchmark display unit D1 are substantially equal. Hence, the cursor crossing the boundary between display units with different DPI values can go from benchmark display unit D1 to extended display unit D2 smoothly, thereby enhancing the quality control of the cursor.

Specifically speaking, the cursor control unit 102 is an input apparatus such as a mouse or a touch panel, for controlling the movement of the cursor. When moved, the cursor control unit 102 (such as a mouse) generates a displacement value corresponding to the movement and sends the displacement value to the processing unit 104. The processing unit 104 calculates a DPI ratio of extended display unit D2 to benchmark display unit D1 in the same axial direction, and adjusts the displacement value according to the DPI ratio so as to generate a modified displacement value, and moves the cursor on extended display unit D2 according to the modified displacement value, such that the velocities of the cursor on extended display unit D2 and benchmark display unit D1 are substantially equal.

Figure 2A:
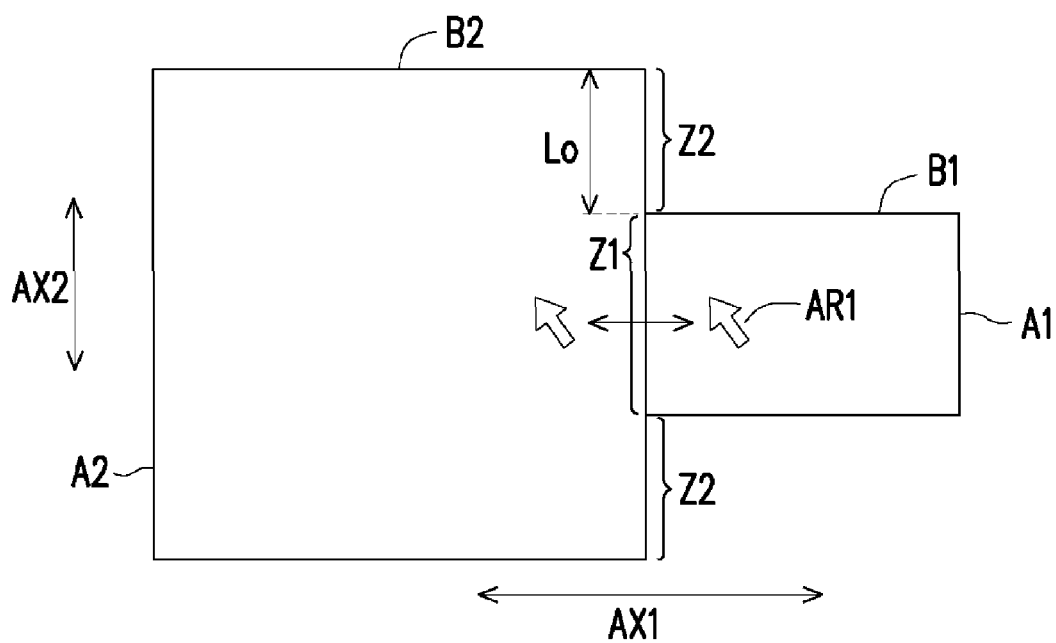
FIG. 2A is a schematic view of a cursor moving within display regions of an extended display unit and a benchmark display unit according to an embodiment of the present invention.

For instance, FIG. 2A is a schematic view of a cursor moving within display regions of an extended display unit and a benchmark display unit according to an embodiment of the present invention. Display region A1 and display region A2 are virtual display regions of benchmark display unit D1 and extended display unit D2, respectively. The display region A1 and display region A2 are aligned in first axial direction AX1 and arranged side by side. In this embodiment, the DPI values of display region A1 in first axial direction AX1 and second axial direction AX2 are denoted with DX1 and DY1, respectively, whereas the DPI values of display region A2 in first axial direction AX1 and second axial direction AX2 are denoted with DX2 and DY2, respectively. After cursor AR1 has moved from display region A1 to display region A2, the modified displacement value M1' of cursor AR1 within display region A2 and in first axial direction AX1 is expressed by the equation as follows:

$$M1'=M1(DX2/DX1) \qquad (1)$$

wherein M1 denotes the displacement value generated in first axial direction AX1 by the cursor control unit 102 as the cursor control unit 102 is moved, when cursor AR1 is within display region A2. Moreover, the modified displacement value M2' of cursor AR1 within display region A2 and in second axial direction AX2 is expressed by the equation as follows:

$$M2'=M2(DY2/DY1) \qquad (2)$$

wherein M2 denotes the displacement value generated in second axial direction AX2 by the cursor control unit 102 as the cursor control unit 102 is moved, when cursor AR1 is within display region A2.

The present invention is characterized by adjusting the position of cursor AR1 within display region A2 according to a DPI ratio in the same axial direction. That is, move cursor AR1 within display region A2 according to the modified displacement value, such that the velocities of cursor AR1 within display region A1 and display region A2 are equal. Hence, when users move the cursor control unit 102 (such as a mouse) at the same velocity in order to control the movement of cursor AR1, the velocity of cursor AR1 remains unchanged even after cursor AR1 has entered display region A2 with a different DPI value, and in consequence the users keep a good control over the movement of cursor AR1, thereby enhancing the quality control of the cursor.

Moreover, in another embodiment, the processing unit 104 further determines the coordinates of the current position of cursor AR1 and controls cursor AR1 to move in first axial direction AX1 according to the coordinates of the current position of cursor AR1 and the displacement value generated from the cursor control unit 102. When cursor AR1 moves from display region A2 to display region A1 or moves from display region A1 to display region A2, the processing unit 104 selects one of the first DPI ratio and the second DPI ratio (wherein the first DPI ratio equals DX1/DX2, and the second DPI ratio equals DX2/DX1, wherein the first DPI ratio is larger than the second DPI ratio) and adjusts the position of cursor AR1 in second axial direction AX2, such that cursor AR1 moves back and forth between display region A1 and display region A2 substantially linearly without leaping suddenly.

For instance, referring to FIG. 2A, when cursor AR1 moves in first axial direction AX1 to go from display region A1 to display region A2, the processing unit 104 selects first DPI ratio and adjusts the position of cursor AR1 in second axial direction AX2 according to the equation as follows:

$$Y1'=Y1(DX1/DX2)+Lo \quad (3)$$

wherein Y1 denotes the distance between cursor AR1 and boundary B1 of display region A1 in second axial direction AX2, Y1' denotes the distance between cursor AR1 and boundary B2 of display region A2 in second axial direction AX2, and Lo denotes the distance between boundary B1 of display region A1 and boundary B2 of display region A2.

Likewise, when cursor AR1 moves in first axial direction AX1 to go from display region A2 to display region A1, the processing unit 104 selects the second DPI ratio and adjusts the position of cursor AR1 in second axial direction AX2 according to the equation as follows:

$$Y1'=(Y1-Lo)(DX2/DX1) \quad (4)$$

By equation (3) and equation (4), as soon as cursor AR1 moves to a display region with a different DPI value, the position of cursor AR1 in second axial direction AX2 is adjusted, such that cursor AR1 moves back and forth between display region A1 and display region A2 substantially linearly without leaping suddenly.

Referring to FIG. 2A, display region A1 and display region A2 include contiguous zone Z1 (i.e., the overlapped portion at the boundary between display region A1 and display region A2) and incontiguous zone Z2 (i.e., the non-overlapped portion at the boundary between display region A1 and display region A2) in first axial direction AX1. In the situation where cursor AR1 crosses contiguous zone Z1 between display region A1 and display region A2 and thus moves to and fro, it is practicable to adjust the position of cursor AR1 in second axial direction AX2 by equation (3) and equation (4).

By contrast, if cursor AR1 is going to cross incontiguous zone Z2 in order to move from display region A1 to display region A2, the processing unit 104 will confine cursor AR1 to display region A1, such that the users can control the movement of cursor AR1 intuitively.

Although the embodiment of FIG. 2A discloses that the cursor control apparatus is exemplified by a horizontal axial direction which functions as first axial direction AX1, the present invention is not limited thereto. For instance, in another embodiment, a vertical axial direction functions as first axial direction AX1. Persons skilled in the art are able to make reference to the aforesaid embodiments and thus infer various ways of controlling the cursor AR1 when the vertical axial direction functions as first axial direction AX1. Hence, related details are not described herein for the sake of brevity.

Figure 2B:
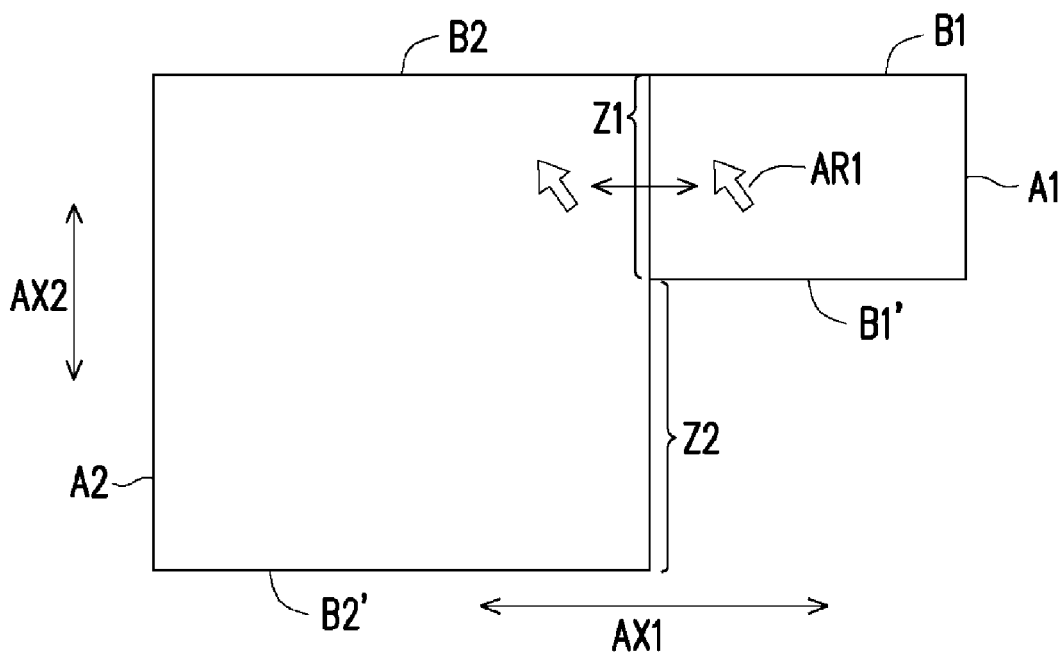
FIG. 2B is a schematic view of the cursor moving within the display regions of the extended display unit and the benchmark display unit according to another embodiment of the present invention.

FIG. 2B is a schematic view of the cursor moving within the display regions of the extended display unit and the benchmark display unit according to another embodiment of the present invention. The differences between the embodiment of FIG. 2B and the embodiment of FIG. 2A are described below. In the embodiment of FIG. 2A, the connected and overlapped portion of display region A1 and display region A2 is located at the middle of display region A2, that is, boundary B1 of display region A1 does not align with boundary B2 of display region A2. By contrast, in the embodiment of FIG. 2B, boundary B1 of display region A1 aligns with boundary B2 of display region A2, and thus the displacement value of cursor AR1 can be modified with equation (1) and equation (2) in the embodiment of FIG. 2A. The position of cursor AR1 in second axial direction AX2 can be adjusted with equation (3) and equation (4) in the embodiment of FIG. 2A. In the embodiment of FIG. 2B, the distance Lo between boundary B1 of display region A1 and boundary B2 of display region A2 equals 0.

Similarly, in the situation where the opposite side (i.e., boundary B1' in the embodiment of FIG. 2B) of boundary B1 of display region A1 is aligned with the opposite side (i.e., boundary B2' in the embodiment of FIG. 2B) of boundary B2 of display region A2, it is practicable to modify the displacement value of cursor AR1 with equation (1) and equation (2) in the embodiment of FIG. 2A and adjust the position of cursor AR1 in second axial direction AX2 with equation (3) and equation (4) in the embodiment of FIG. 2A. Since the adjustment of the displacement value of cursor AR1 and the position of cursor AR1 in second axial direction AX2 is not affected by the connected and overlapped portion of display region A1 and display region A2, that is, it can still be accomplished with the equations in the embodiment of FIG. 2A, no other adjustment techniques need to be described herein for the sake of brevity. In this regard, Lo denotes the distance between boundary B1 of display region A1 and boundary B2 of display region A2.

Figure 3:
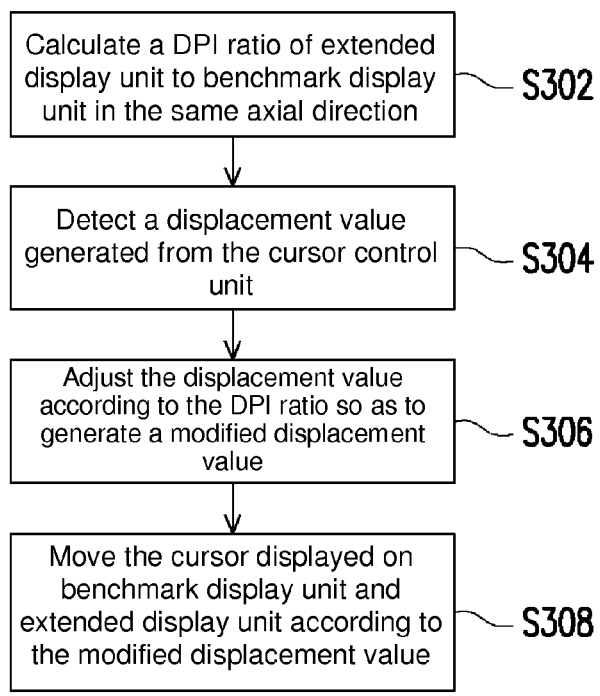
FIG. 3 is a schematic view of the process flow of a cursor velocity adjustment method according to an embodiment of the present invention.

FIG. 3 is a schematic view of the process flow of a cursor velocity adjustment method according to an embodiment of the present invention. Referring to the above description of the cursor control apparatus in the above embodiments, it is understandable that the cursor velocity adjustment method comprises the following step. First, calculate a DPI ratio of extended display unit to benchmark display unit in the same axial direction (step S302). The DPI ratio in the same axial direction includes the DPI ratio in a first axial direction and the DPI ratio in a second axial direction, wherein the modified displacement value generated indicates the modified displacement values in the first axial direction and the second axial direction, respectively. Then, detect a displacement value generated from the cursor control unit (step S304). Afterward, adjust the displacement value according to the DPI ratio so as to generate a modified displacement value (step S306). Step S306 comprises multiplying the displacement values in the first and second axial directions by the DPI ratios of the extended display unit to the benchmark display unit in the first and second axial directions, respectively, so as to obtain the modified displacement values in the first and second axial directions, respectively. Afterward, move the cursor displayed on benchmark display unit and extended display unit according to the modified displacement value (step S308).

Figure 4:
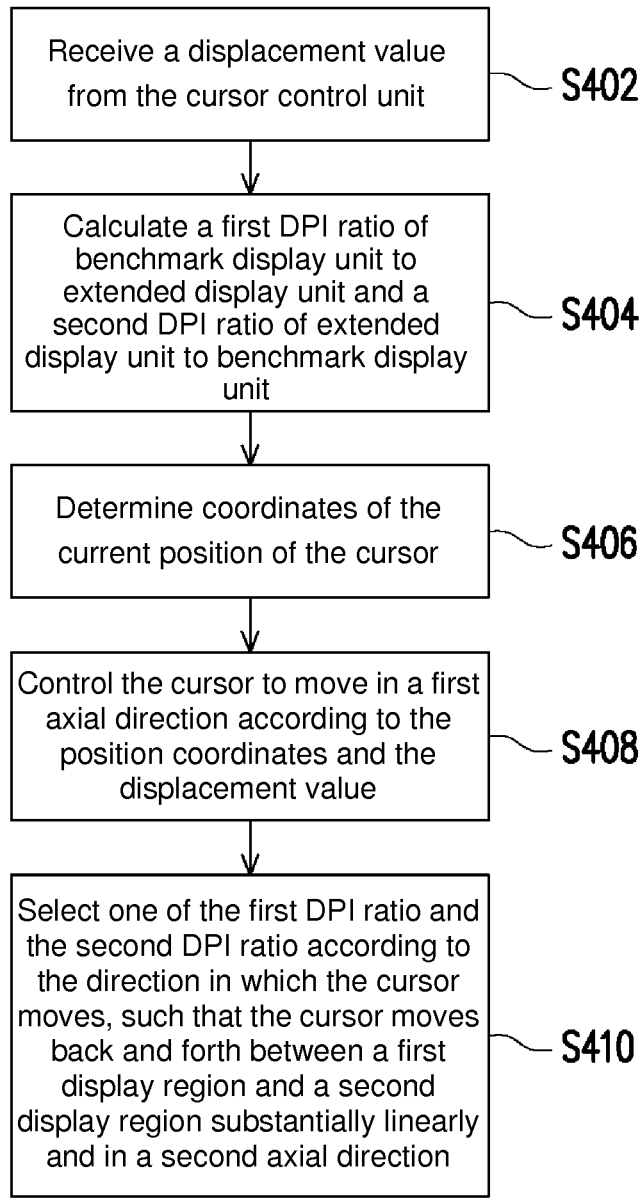
FIG. 4 is a schematic view of the process flow of a cursor control method according to an embodiment of the present invention.

FIG. 4 is a schematic view of the process flow of a cursor control method according to an embodiment of the present invention. Referring to the above embodiments for the description as to how the processing unit 104 adjusts the position of cursor AR1 in second axial direction AX2, it is understandable that the cursor control method comprises the following step. First, receive a displacement value from the cursor control unit (step S402). Then, calculate a first DPI ratio of the benchmark display unit to the extended display unit and a second DPI ratio of the extended display unit to the benchmark display unit (step S404), wherein, in this embodiment, the benchmark display unit have the first display region, and the extended display unit have the second display region, wherein the first display region is adjacent to the second display region in the first axial direction, wherein the first DPI ratio is larger than the second DPI ratio. Then, determine the coordinates of the current position of the cursor (step S406). Afterward, control the cursor to move in a first axial direction according to the position coordinates and the displacement value (step S408), wherein the first axial direction may be a horizontal axial direction or a vertical axial direction. Finally, select one of the first DPI ratio and the second DPI ratio according to the direction in which the cursor moves, such that the cursor moves back and forth between a first display region and a second display region substantially linearly and in a second axial direction (step S410), wherein the first axial direction is perpendicular to the second axial direction. For instance, step S410 entails selecting the first DPI ratio when the cursor moves in the first axial direction to go from the first display region to the second display region, and selecting the second DPI ratio when the cursor moves in the first axial direction to go from second display region to the first display region.

Figure 5:
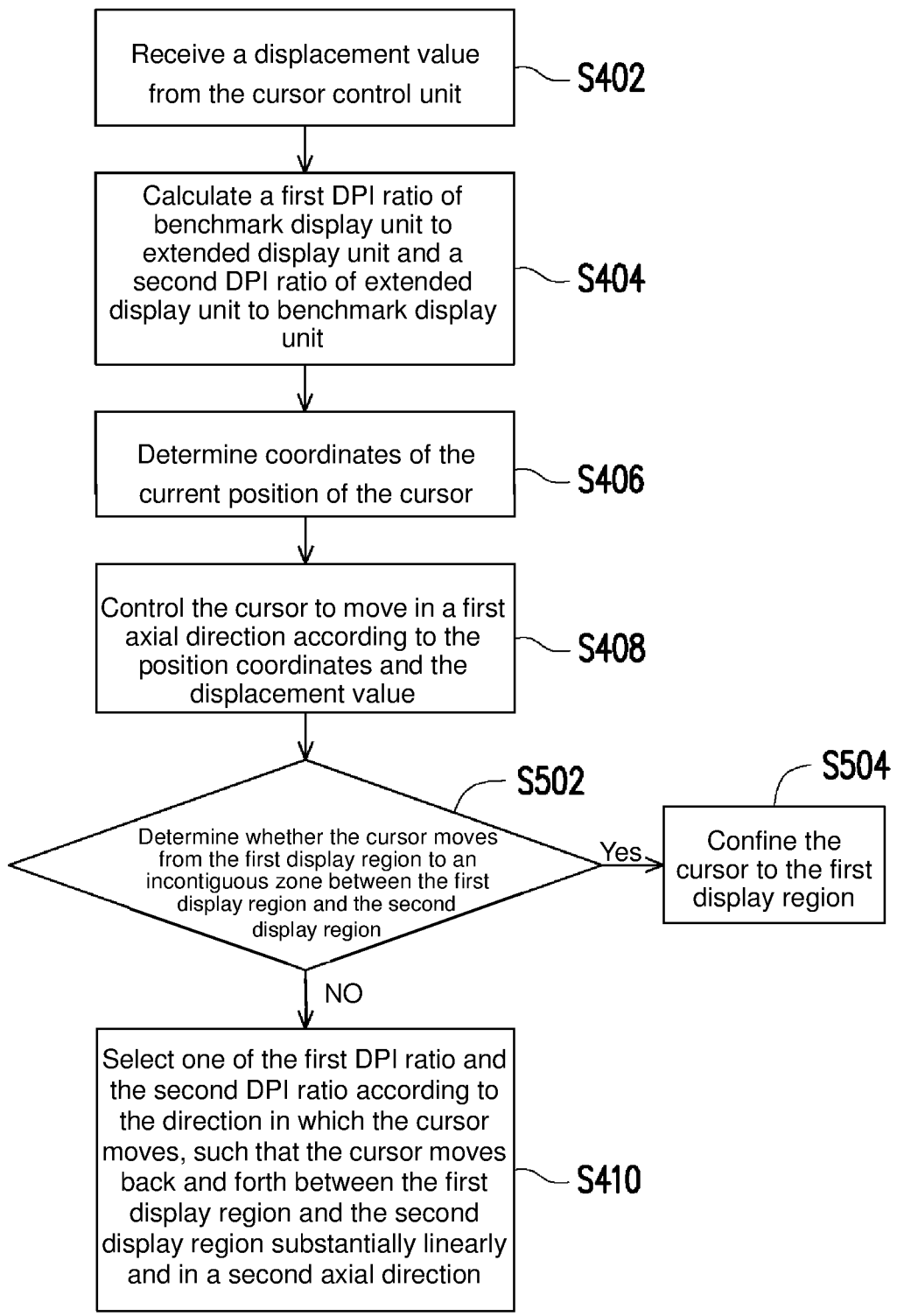
FIG. 5 is a schematic view of the process flow of the cursor control method according to another embodiment of the present invention.

FIG. 5 is a schematic view of the process flow of the cursor control method according to another embodiment of the present invention. The differences between the embodiment of FIG. 5 and the embodiment of FIG. 4 are described below. The embodiment of FIG. 5 further comprises step S502 and step S504. After step S408, the cursor control method of the embodiment of FIG. 5 further determines whether the cursor moves from the first display region to the incontiguous zone between the first display region and the second display region (step S502). If the cursor moves from the first display region to the incontiguous zone between the first display region and the second display region, the cursor will be confined to the first display region (step S504). Conversely, if the cursor does not move from the first display region to the incontiguous zone between the first display region and the second display region, the process flow of the method goes to step S410 which entails selecting one of first DPI ratio and second DPI ratio according to the direction in which the cursor moves.

In conclusion, the present invention involves adjusting a displacement value according to the DPI ratio of extended display unit to benchmark display unit in the same axial direction so as to generate a modified displacement value and moving the position of the cursor on extended display unit according to the modified displacement value such that the velocity of the cursor remains unchanged after the cursor has moved to a display unit of a different resolution, thereby enhancing the quality control of the cursor. Moreover, in another embodiment, it is practicable to adjust the position of the cursor in the second axial direction when the cursor moves between display units with different resolutions according to the DPI ratios of display units with different DPI values in first axial direction, such that the cursor moves smoothly between the display units with different resolutions, so as to enhance the quality control of the cursor, wherein the first axial direction is perpendicular to the second axial direction, and the display units with different DPI values are aligned in the first axial direction and arranged side by side. In yet another embodiment, if the cursor would otherwise cross an incontiguous zone while moving from the first display region to the second display region, the cursor will be confined to the first display region, such that users can control the movement of the cursor intuitively.

What is claimed is:

1. A cursor control apparatus, adapted to control a cursor to move back and forth between a benchmark display unit and an extended display unit, wherein the benchmark display unit has a first display region, and the extended display unit has a second display region, wherein the first display region and the second display region are adjacent to each other in a first axial direction, the cursor control apparatus comprising:
    a cursor control unit for generating a displacement value when moved; and
    a processing unit coupled to the benchmark display unit, the extended display unit, and the cursor control unit, wherein the cursor control unit sends the displacement value to the processing unit, wherein the processing unit calculates a first DPI (dots per inch) ratio of the benchmark display unit to the extended display unit and a second DPI (dots per inch) ratio of the extended display unit to the benchmark display unit, and determines coordinates of a current position of the cursor, controls the cursor to move in the first axial direction according to the position coordinates and the displacement value, wherein when the cursor moves from the first display region to the second display region, the processing unit adjusts a position of the cursor in a second axial direction according to the first DPI ratio, and when the cursor moves from the second display region to the first display region, the processing unit adjusts a position of the cursor in the second axial direction according to the second DPI ratio, such that the cursor moves back and forth between the first display region and the second display region substantially linearly, wherein the first axial direction is perpendicular to the second axial direction.

2. The cursor control apparatus of claim 1, wherein the first axial direction is a horizontal axial direction, and the first DPI ratio is larger than the second DPI ratio.

3. The cursor control apparatus of claim 2, wherein the first display region and the second display region further comprise an incontiguous zone in the first axial direction, wherein the cursor is confined to the first display region until the second display region is reached when the cursor is moved from the first display region to the second display region via the incontiguous zone.

4. The cursor control apparatus of claim 1, wherein the first axial direction is a vertical axial direction, and the first DPI ratio is larger than the second DPI ratio.

5. The cursor control apparatus of claim 4, wherein the first display region and the second display region further comprise an incontiguous zone in the first axial direction, and the cursor is confined to the first display region until the second display region is reached when the cursor is moved from the first display region to the second display region via the incontiguous zone.

6. The cursor control apparatus of claim 1, wherein when the cursor moves from the first display region to the second display region, the processing unit adjusts the position of the cursor in the second axial direction according to the equation as follows:

$$Y1'=Y1(DPI1)+Lo$$

wherein Y1 denotes a distance between the cursor and a boundary of the first display region in the second axial direction, Y1' denotes a distance between the cursor and a boundary of the second display region in the second axial direction, DPI1 denotes the first DPI ratio, and Lo denotes a distance between the boundary of first display region and the boundary of the second display region in the second axial direction.

7. The cursor control apparatus of claim 1, wherein when the cursor moves from the second display region to the first display region, the processing unit adjusts the position of the cursor in the second axial direction according to the equation as follows:

$$Y1'=(Y1-Lo)(DPI2)$$

wherein Y1 denotes a distance between the cursor and a boundary of the first display region in the second axial direction, Y1' denotes a distance between the cursor and a boundary of the second display region in the second axial direction, DPI2 denotes the second DPI ratio, and Lo denotes a distance between the boundary of first display region and the boundary of the second display region in the second axial direction.

8. The cursor control apparatus of claim 1, wherein the first DPI ratio and the second DPI ratio are calculated along the first axial direction.

9. A cursor control method, adapted to control a cursor to move back and forth between a benchmark display unit and an extended display unit, wherein the benchmark display unit has a first display region, and the extended display unit has a second display region, wherein the first display region and the second display region are adjacent to each other in a first axial direction, the cursor control method comprising the steps of:
receiving a displacement value generated from a cursor control unit when moved;
calculating a first DPI (dots per inch) ratio of the benchmark display unit to the extended display unit and a second DPI (dots per inch) ratio of the extended display unit to the benchmark display unit;
determining coordinates of a current position of the cursor;
controlling the cursor to move in the first axial direction according to the position coordinates and the displacement value; and
when the cursor moves from the first display region to the second display region, the processing unit adjusting a position of the cursor in a second axial direction according to the first DPI ratio, and when the cursor moves from the second display region to the first display region, adjusting a position of the cursor in the second axial direction according to the second DPI ratio, such that the cursor moves back and forth between the first display region and the second display region substantially linearly, wherein the first axial direction is perpendicular to the second axial direction.

10. The cursor control method of claim 9, wherein the first axial direction is a horizontal axial direction, and the first DPI ratio is larger than the second DPI ratio.

11. The cursor control method of claim 10, wherein the first display region and the second display region further comprise an incontiguous zone in the first axial direction, wherein the cursor is confined to the first display region until the second display region is reached when the cursor is moved from the first display region to the second display region via the incontiguous zone.

12. The cursor control method of claim 9, wherein the first axial direction is a vertical axial direction, and the first DPI ratio is larger than the second DPI ratio.

13. The cursor control method of claim 12, wherein the first display region and the second display region further comprise an incontiguous zone in the first axial direction, and the cursor is confined to the first display region until the second display region is reached when the cursor is moved from the first display region to the second display region via the incontiguous zone.

14. The cursor control method of claim 9, wherein when the cursor moves from the first display region to the second display region, the position of the cursor is adjusted in the second axial direction according to the equation as follows:

$$Y1'=Y1(R1)+Lo$$

wherein Y1 denotes a distance between the cursor and a boundary of the first display region in the second axial direction, Y1' denotes a distance between the cursor and a boundary of the second display region in the second axial direction, R1 denotes the first DPI ratio, and Lo denotes a distance between the boundary of first display region and the boundary of the second display region in the second axial direction.

15. The cursor control method of claim 9, wherein when the cursor moves from the second display region to the first display region, the position of the cursor is adjusted in the second axial direction according to the equation as follows:

$$Y1'=(Y1-Lo)(R2)$$

wherein Y1 denotes a distance between the cursor and a boundary of the first display region in the second axial direction, Y1' denotes a distance between the cursor and a boundary of the second display region in the second axial direction, R2 denotes the second DPI ratio, and Lo denotes a distance between the boundary of first display region and the boundary of the second display region in the second axial direction.

16. The cursor control method of claim 9, wherein the first DPI ratio and the second DPI ratio are calculated along the first axial direction.

* * * * *